United States Patent
Deng et al.

(10) Patent No.: US 9,513,499 B2
(45) Date of Patent: Dec. 6, 2016

(54) LASER REPAIRING APPARATUS

(71) Applicants: BOE TECHNOLOGY GROUP CO., LTD., Beijing (CN); HEFEI BOE OPTOELECTRONICS TECHNOLOGY CO., LTD., Anhui (CN)

(72) Inventors: Yuxin Deng, Beijing (CN); Manping Niu, Beijing (CN); Ran Tong, Beijing (CN); Wei Qin, Beijing (CN); Yonggang Du, Beijing (CN)

(73) Assignees: BOE TECHNOLOGY GROUP CO., LTD., Beijing (CN); HEFEI BOE OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 163 days.

(21) Appl. No.: 14/424,467

(22) PCT Filed: May 21, 2014

(86) PCT No.: PCT/CN2014/078014
§ 371 (c)(1),
(2) Date: Feb. 27, 2015

(87) PCT Pub. No.: WO2015/067026
PCT Pub. Date: May 14, 2015

(65) Prior Publication Data
US 2016/0299365 A1   Oct. 13, 2016

(30) Foreign Application Priority Data
Nov. 5, 2013   (CN) .......................... 2013 1 0544524

(51) Int. Cl.
*G02F 1/13*   (2006.01)

(52) U.S. Cl.
CPC .................................. *G02F 1/1309* (2013.01)

(58) Field of Classification Search
CPC ..................................................... G02F 1/1309
See application file for complete search history.

(56) References Cited

U.S. PATENT DOCUMENTS

2006/0285068 A1* 12/2006 Kawada ................ G02F 1/1303
349/192
2012/0206158 A1   8/2012 Yassine et al.

FOREIGN PATENT DOCUMENTS

CN         1705889 A      12/2005
CN         1873480 A      12/2006
(Continued)

OTHER PUBLICATIONS

Notification of the First Office Action dated Jul. 28, 2015 corresponding to Chinese application No. 201310544524.2.
(Continued)

*Primary Examiner* — Donald Raleigh
*Assistant Examiner* — Kevin Quarterman
(74) *Attorney, Agent, or Firm* — Nath, Goldberg & Meyer; Joshua B. Goldberg

(57) ABSTRACT

The present invention discloses a laser repairing apparatus for a display panel, which comprises a laser generating device, a bearing device, a backlight, a first polarizer, a second polarizer and an image generating device, the laser generating device is located above the bearing device, the first polarizer is located between the backlight and the bearing device, and the second polarizer is located between the image generating device and the bearing device. In the technical solution of the present invention, the first polarizer and the second polarizer are used to control the amount of light transmittance of the transmission light, and the human eye can identify the exact positions of the defective pixels quickly and accurately by means of the transmission image (Continued)

having overall low brightness, and consequently, the time required for the whole repairing process is shortened.

18 Claims, 2 Drawing Sheets

(56) References Cited

FOREIGN PATENT DOCUMENTS

| CN | 2007163822 A | 6/2007 |
|----|--------------|--------|
| CN | 101034214 A  | 9/2007 |
| CN | 101211024 A  | 7/2008 |
| CN | 101750770 A  | 6/2010 |
| CN | 202008561 U  | 10/2011 |
| CN | 103558698 A  | 2/2014 |
| JP | 2007163822 A | 6/2007 |

OTHER PUBLICATIONS

Written Opinion of the International Searching Authority dated Sep. 1, 2014 corresponding to International application No. PCT/CN2014/078014.
International Search Report dated May 21, 2014 corresponding to application No. PCT/CN2014/078014.

* cited by examiner

LASER REPAIRING APPARATUS

This is a National Phase Application filed under 35 U.S.C. 371 as a national stage of PCT/CN2014/078014, filed May 21, 2014, an application claiming the benefit of Chinese Application No. 201310544524.2, filed Nov. 5, 2013, the content of each of which is hereby incorporated by reference in its entirety.

FIELD OF THE INVENTION

The present invention relates to the field of display technology, and particularly to a laser repairing apparatus for a display panel.

BACKGROUND OF THE INVENTION

Impurities (such as dust, metal, organic matter) existing in a display panel become one of the major defects of the display panel. When impurities are located in a display area of the display panel, corresponding defective pixels will emit brighter light than normal pixels, and this phenomenon is known as light leak phenomenon.

Defect repairing and redetection need to be performed on a display panel when light leak phenomenon is detected in the display panel during display detection.

In the process of display detection, multiple shorting bars, which are used for shorting out relevant data line and gate line, are first provided on the display panel, then a probe of the display detection device is used to connect to terminals of the shorting bars, and in this way, display detection can be performed on the display panel. When the light leak phenomenon is detected in the display panel, the light leak area of the display panel is marked by a circle with a marker pen.

In defect repairing, a laser repairing apparatus is generally used to repair. FIG. 1 is a schematic diagram of a structure of a laser repairing apparatus in the prior art, as shown in FIG. 1, the laser repairing apparatus comprises: a bearing device 2, a laser generating device 1, a backlight 3 and a high-power microscope 5, a display panel 4 is placed on the bearing device 2, the high-power microscope 5 and the laser generating device 1 are located above the display panel 4, and the backlight 3 is located below the bearing device 2. Before the display panel 4 is repaired by using the laser generating device 1, the backlight 3 is turned on, and then a circular marker on the display panel is observed by moving the high-power microscope 5 so as to search for positions of defective pixels. After the positions of defective pixels are found, the backlight 3 is turned off, and then position of the laser generating device 1 is adjusted, so as to repair the defective pixels through laser 15 emitted from the laser generating device 1.

Display detection is performed again after repair of the defective pixels is completed.

However, when searching for the defective pixels by using the high-power microscope, even though the defective pixels may emit brighter light than normal pixels, since an image formed in the high-power microscope is overall bright, brightness contrast between the defective pixels and the normal pixels is small, as a result, human eye can hardly capture exact positions of the defective pixels, and thus the whole repairing process is affected.

SUMMARY OF THE INVENTION

The present invention provides a laser repairing apparatus for a display panel, which enable human eye to capture the positions of the defective pixels on the display panel easily.

To achieve the above object, the present invention provides a laser repairing apparatus which comprises a laser generating device used for generating and emitting laser, a bearing device used for bearing the display panel, a backlight used for generating and emitting transmission light, a first polarizer and a second polarizer used for adjusting amount of light transmittance of the transmission light, and an image generating device used for receiving the transmission light having sequentially passed through the first polarizer, the display panel and the second polarizer and generating a corresponding transmission image, wherein, the laser generating device is located above the bearing device, the first polarizer is located between the backlight and the bearing device, and the second polarizer is located between the image generating device and the bearing device.

Optionally, the laser repairing apparatus further comprises a transflective device which is used for reflecting the transmission light having passed through the display panel and allowing the laser to pass, and the transflective device is located above the bearing device.

Optionally, the laser repairing apparatus further comprises a reflective device which is used for reflecting the transmission light having passed through the second polarizer to the image generating device, and the reflective device is located between the second polarizer and the image generating device.

Optionally, the laser repairing apparatus further comprises a fixing device which is used for fixing the display panel to the bearing device, and the fixing device is located on the bearing device.

Optionally, the laser repairing apparatus further comprises an image processing device used for processing the transmission image generated by the image generating device to obtain coordinates of defective pixels on the display panel, and an adjusting device used for adjusting irradiating direction of the laser generating device according to the coordinates, wherein the image processing device is connected to the image generating device, and the adjusting device is connected to the laser generating device.

Optionally, the laser repairing apparatus further comprises a rotating device which is used for driving the first polarizer and/or the second polarizer to rotate so as to change a relative angle between a polarization axis of the first polarizer and a polarization axis of the second polarizer, and the rotating device is connected to the first polarizer and/or the second polarizer.

Optionally, the rotating device comprises an active gear and a driven gear meshing with the active gear, and the first polarizer and/or the second polarizer are fixed to the driven gear.

Optionally, the rotating device further comprises a drive motor which is used for driving the active gear to rotate, and the drive motor is connected to the active gear.

Optionally, the first polarizer is attached to a light-exiting side of the backlight, and the second polarizer is attached to a light-entering side of the image generating device.

Optionally, the laser repairing apparatus further comprises a focusing device which is used for adjusting a focal length of the image generating device, and the focusing device is connected to the image generating device.

Optionally, when an initial twist angle of liquid crystals in the display panel is zero degree, the first polarizer and/or the second polarizer are adjusted so that a relative angle between a polarization axis of the first polarizer and a polarization axis of the second polarizer is 90 degrees; when the initial twist angle of liquid crystals in the display panel is 90 degrees, the first polarizer and/or the second polarizer are adjusted so that the relative angle between the polarization axis of the first polarizer and the polarization axis of the second polarizer is zero degree.

The present invention has the following beneficial effects: in the technical solution of the present invention, the first polarizer and the second polarizer are used to control the amount of light transmittance of the transmission light, so that the overall brightness of the transmission image generated by the image generating device is relatively low, the portions of the transmission image respectively corresponding to the defective pixels and the normal pixels have a large brightness contrast therebetwen, and the human eye can identify the exact positions of the defective pixels quickly and accurately by means of the transmission image having overall low brightness, and consequently, the time required for the whole repairing process is shortened. Meanwhile, the laser repairing apparatus can also track and observe the repair condition of the defective pixels while repairing the defective pixels.

DETAILED DESCRIPTION OF THE EMBODIMENTS

To enable those skilled in the art better understand technical solutions of the present invention, a laser repairing apparatus provided by the present invention will be described in detail below in conjunction with the accompanying drawings.

Figure 1:
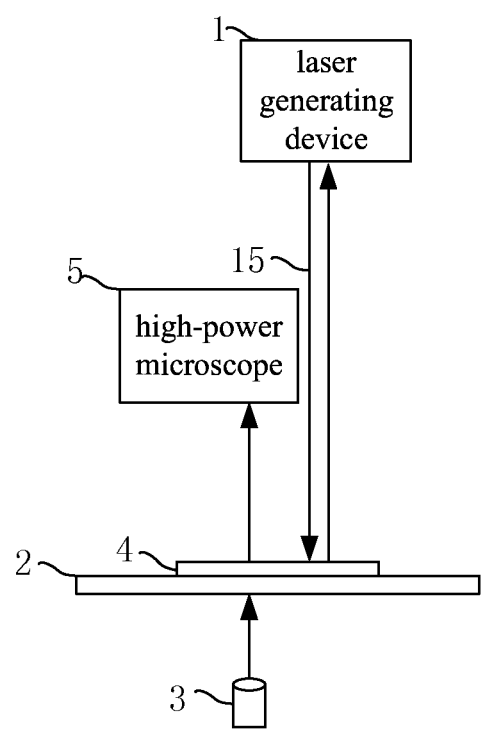
FIG. 1 is a schematic diagram of a structure of a laser repairing apparatus in the prior art.
Figure 2:
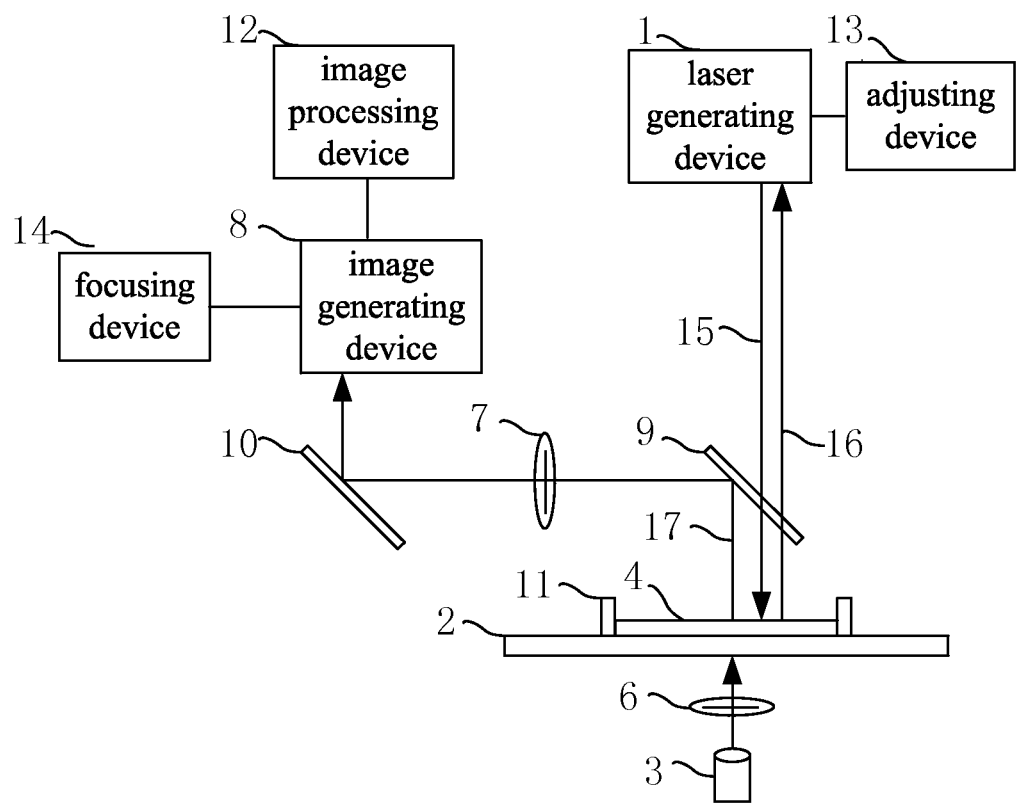
FIG. 2 is a schematic diagram of a structure of a laser repairing apparatus provided by an embodiment of the present invention.

FIG. 2 is a schematic diagram of a structure of a laser repairing apparatus provided by an embodiment of the present invention, as shown in FIG. 2, the laser repairing apparatus comprises: a laser generating device 1, a bearing device 2, a backlight 3, a first polarizer 6, a second polarizer 7 and an image generating device 8, wherein, the laser generating device 1 is located above the bearing device 2, the first polarizer 6 is located between the backlight 3 and the bearing device 2, the second polarizer 7 is located between the image generating device 8 and the bearing device 2, the laser generating device 1 is used for generating and emitting laser 15, the bearing device 2 is used for bearing a display panel 4, the backlight 3 is used for generating and emitting transmission light 17, the first polarizer 6 and the second polarizer 7 are used for controlling the amount of light transmittance of the transmission light 17, and the image generating device 8 is used for receiving the transmission light 17 sequentially having passed through the first polarizer 6, the display panel 4 and the second polarizer 7 and generating a corresponding transmission image.

Optionally, the image generating device 8 is a charge coupled device (CCD for short) image sensor.

The principle of the technical solution of the present embodiment will be described in detail below with reference to FIG. 2. A display panel 4 in which an initial twist angle of liquid crystals is zero degree is taken as an example, that is, in this case, when no voltage is applied to the display panel 4, a difference between a polarization angle of polarized light which has exited from the first polarizer 6 but not entered the display panel 4 yet and a polarization angle of the polarized light after exiting from the display panel 4 is zero degree.

Firstly, the backlight 3 generates the transmission light 17 and emits the transmission light 17 toward the first polarizer 6, and the transmission light 17 has a first polarization direction, which is identical with a polarization axis direction of the first polarizer 6, after subjected to the action of the first polarizer 6.

Secondly, the transmission light 17 has a second polarization direction after the transmission light 17 having the first polarization direction is subjected to the action of liquid crystals in the display panel 4. Since the initial twist angle of the liquid crystals is zero degree, the second polarization direction is the same as the first polarization direction.

Afterwards, the transmission light 17 having the second polarization direction is irradiated toward the second polarizer 7, and the second polarizer 7 is adjusted so that a relative angle between the polarization axis of the second polarizer 7 and the polarization axis of the first polarizer 6 is approximately 90 degrees. In this case, since the polarization direction of the transmission light 17 having the second polarization direction is approximately perpendicular to the polarization axis direction of the second polarizer 7, a large amount of transmission light 17 cannot pass through the second polarizer 7, namely, the amount of light transmittance of the transmission light 17 is small.

It should be noted that, in the technical solution of the present embodiment, the relative angle between the polarization axis of the second polarizer 7 and the polarization axis of the first polarizer 6 can also be set to be approximately 90 degrees by adjusting the first polarizer 6 or adjusting the first and second polarizer 6 and 7 at the same time.

Subsequently, a small amount of transmission light 17 is received by the image generating device 8 and a corresponding transmission image is generated. Since only a small amount of transmission light 17 enters the image generating device 8, overall brightness of the transmission image generated by the image generating device 8 is relatively low, which results in a large brightness contrast between a portion of the transmission image corresponding to the defective pixels and a portion of the transmission image corresponding to the normal pixels. Specifically, the brighter spots correspond to the defective pixels on the display panel 4, the darker spots correspond to the normal pixels on the display panel 4, and human eye can identify the exact positions of the defective pixels quickly and accurately with the aid of the positions of the brighter spots in the transmission image.

It should be noted that, when the initial twist angle of the liquid crystals in the display panel 4 is 90 degrees, the relative angle between the polarization axis of the second polarizer 7 and the polarization axis of the first polarizer 6 can be set to be zero degree by adjusting the second polarizer 7, and also in this case, only a small amount of transmission light 17 can enter the image generating device 8.

Finally, the position of the laser generating device 1 is adjusted according to the identified exact positions of the defective pixels, so as to repair the defective pixels by using the laser 15 emitted from the laser generating device 1.

In the present embodiment, the first polarizer 6 is used for generating polarized light, the second polarizer 7 is used for filtering the polarized light, and the amount of light transmittance of the transmission light 17 is adjusted by changing the relative angle between the polarization axis of the second polarizer 7 and the polarization axis of the first polarizer 6, thus controlling brightness of the transmission image generated by the image generating device 8.

When identifying the exact positions of the defective pixels based on the transmission image, the first polarizer 6 and/or the second polarizer 7 can be adjusted continuously to change the brightness of the transmission image until the human eye can easily distinguish the defective pixels from the normal pixels by means of the transmission image.

In the present embodiment, using the backlight 3, the first polarizer 6, the second polarizer 7 and the image generating device 8 to determine the exact positions of the defective pixels has the following advantages.

Firstly, the image generating device 8 can be used to obtain an image of a large area on the display panel 4, thus the possibility of capturing the defective pixels is higher, movement of the image generating device 8 can be reduced, and it is easier for a person to find all of the defective pixels.

Secondly, since different people are sensitive to light to different degrees, the first polarizer 6 and/or the second polarizer 7 can be used to control the amount of light transmittance of the transmission light 17, so that the transmission image presents brightness that the human eye is most sensitive to, and therefore, it is easier for the human eye to distinguish the defective pixels from the normal pixels.

Thirdly, in the process of using the laser generating device 1 to repair the defective pixels, the image generating device 8 can be further used to track and observe the repair condition of the defective pixels. Specifically, when using the laser generating device 1 to repair the defective pixels, the backlight 3 is still on, and the transmission image generated by the image generating device 8 is observed. Under this condition, the portion of the transmission image corresponding to the defective pixels should have gradually reduced brightness, and it indicates that the repair of the defective pixels is completed when brightness is uniform throughout the transmission image.

Optionally, the laser repairing apparatus further comprises a transflective device 9 which is located above the bearing device 2 and used for reflecting the transmission light 17 having passed through the display panel 4 and allowing the laser 15(16) to pass.

Specifically, when using the image generating device 8 to track and observe the repair condition of the defective pixels, part of the laser 15 will be reflected by the surface of the display panel 4, and then enter the image generating device 8 after passing through the second polarizer 7, which may affect imaging quality of the image generating device 8, and is unfavorable for tracking and observing the repair condition of the defective pixels. To prevent the laser 16 from entering the image generating device 8, the transflective device 9 is provided above the bearing device 2 which, as shown in FIG. 2, can reflect the transmission light 17 having exited from the display panel 4 to the second polarizer 7, allow the laser 15 irradiated toward the display panel 4 to pass to arrive at the display panel 4, and also allow the laser 16 reflected by the display panel 4 to pass to arrive at the laser generating device 1. The transflective device 9 filters out the laser 16 reflected by the display panel 4 from the light path of the transmission light 17, so that the laser 16 cannot enter the image generating device 8, which effectively ensures the imaging quality of the image generating device 8 and facilitates tracking and observing the repair condition of the defective pixels while using the laser 15 to repair the defective pixels.

Optionally, the laser repairing apparatus further comprises: a reflective device 10, which is located between the second polarizer 7 and the image generating device 8, and used for reflecting the transmission light 17 having passed through the second polarizer 7 to the image generating device 8.

In FIG. 2, the image generating device 8 is located above the bearing device 2. However, in a practical design process, the reflective device 10 can be used to change propagating direction of the transmission light 17, so that the position of the image generating device 8 may not be limited.

Optionally, the laser repairing device further comprises: a fixing device 11 which is used for fixing the display panel 4 to the bearing device 2 and located on the bearing device 2. The fixing device 11 can effectively avoid movement of the display panel 4 relative to the bearing device 2.

Optionally, the laser repairing device further comprises: an image processing device 12 connected to the image generating device 8 and an adjusting device 13 connected to the laser generating device 1. The image processing device 12 is used for processing the transmission image generated by the image generating device 8 to obtain coordinates of the defective pixels on the display panel 4, and the adjusting device 13 is used for adjusting irradiating direction of the laser generating device 1 according to the coordinates of the defective pixels.

With the image processing device 12 and the adjusting device 13 provided in the laser repairing device, the laser 15 emitted from the laser generating device 1 can be automatically aimed at the defective pixels. Specifically, the image processing device 12 processes the transmission image generated by the image generating device 8 by using an image processing technique, and calculates the coordinates of the defective pixels according to the property that the defective pixels and the normal pixels are different in brightness, and the adjusting device 13 adjusts the irradiation direction of the laser generating device 1 according to the calculated coordinates of the defective pixels, so as to automatically aim the emitted laser 15 at the defective pixels. With the image processing device 12 and the adjusting device 13, automatic repair can be achieved and labor costs can be greatly reduced.

Optionally, the laser repairing device further comprises: a rotating device which is connected to the first polarizer 6 and the second polarizer 7 and used for driving the first polarizer 6 and the second polarizer 7 to rotate so as to change the relative angle between the polarization axis of the first polarizer 6 and the polarization axis of the second polarizer 7.

Figure 3:
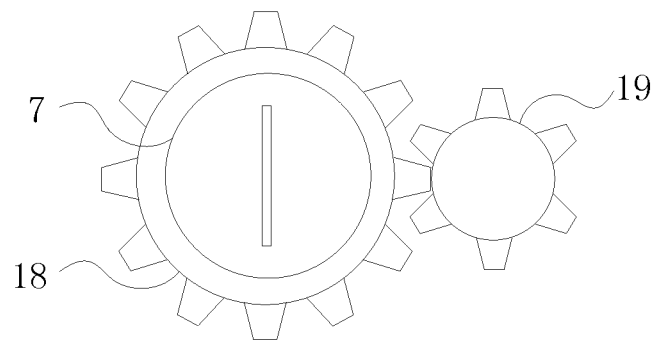
FIG. 3 is a schematic diagram of a structure of a rotating device.

FIG. 3 is a schematic diagram of a structure of the rotating device, and as shown in FIG. 3, further, the rotating device comprises: an active gear 19, a driven gear 18 meshing with the active gear 19 and a drive motor (not shown in the figure) used for driving the active gear 19 to rotate. The first polarizer 6 and the second polarizer 7 are fixed to the driven gear 18, and the drive motor is connected to the active gear 19. The drive motor drives the active gear 19 to rotate, the active gear 19 drives the driven gear 18 to rotate, and the driven gear 18 drives the first polarizer 6 and the second polarizer 7 to rotate, thereby changing the relative angle between the polarization axis of the first polarizer 6 and the polarization axis of the second polarizer 7. With the drive motor, the active gear 19 and the driven gear 18, the relative angle between the polarization axis of the first polarizer 6 and the polarization axis of the second polarizer 7 can be precisely adjusted, and further precise control of the brightness of the transmission image can be achieved. Here, FIG. 3 only illustrates a case that the second polarizer 7 is fixed to the driven gear 18, and a case that the first polarizer 6 is fixed to the driven gear 18 is the same as that shown in FIG. 3.

It should be noted that, in the present embodiment, the relative angle between the polarization axis of the first polarizer 6 and the polarization axis of the second polarizer 7 can be adjusted by only rotating the first polarizer 6 or only rotating the second polarizer 7.

Optionally, the first polarizer 6 is attached to a light-exiting side of the backlight 3, and the second polarizer 7 is attached to a light-entering side of the image generating device 8.

Optionally, the laser repairing device further comprises: a focusing device 14 which is connected to the image generating device 8 and used for adjusting a focal length of the image generating device 8. Since the image generating device 8 can obtain the transmission image of only a limited area on the display panel 4 each time, when the repair of the defective pixels in one area is completed and the defective pixels in a next area need to be repaired, it is necessary to adjust the position of the image generating device 8, thus the focal length of the image generating device 8 needs to be adjusted, and the focusing device 14 can be configured to achieve auto-focusing of the image generating device 8.

In the laser repairing apparatus provided by the embodiments of the present invention, the first polarizer and the second polarizer are used to control the amount of light transmittance of the transmission light, so that the overall brightness of the transmission image generated by the image generating device is relatively low, the portion of the transmission image corresponding to the defective pixels and the portion of the transmission image corresponding to the normal pixels have a large brightness contrast therebetwen, and the human eye can identify the exact positions of the defective pixels quickly and accurately by means of the transmission image having overall low brightness, and consequently, the time required for the whole repairing process is shortened. Meanwhile, the laser repairing apparatus can also track and observe the repair condition of the defective pixels while repairing the defective pixels.

It can be understood that, the above implementations are merely exemplary implementations used for explaining the principle of the present invention, but the present invention is not limited thereto. For those skilled in the art, various modifications and improvements may be made without departing from the spirit and essence of the present invention, and these modifications and improvements are also deemed as falling within the protection scope of the present invention.

The invention claimed is:

1. A laser repairing apparatus for a display panel, comprising a laser generating device used for generating and emitting laser, a bearing device used for bearing the display panel, a backlight used for generating and emitting transmission light, a first polarizer and a second polarizer used for adjusting amount of light transmittance of the transmission light, and an image generating device used for receiving the transmission light having sequentially passed through the first polarizer, the display panel and the second polarizer and generating a corresponding transmission image, wherein, the laser generating device is located above the bearing device, the first polarizer is located between the backlight and the bearing device, and the second polarizer is located between the image generating device and the bearing device.

2. The laser repairing apparatus according to claim 1, further comprising a transflective device which is used for reflecting the transmission light having passed through the display panel and allowing the laser to pass, and the transflective device is located above the bearing device.

3. The laser repairing apparatus according to claim 1, further comprising a reflective device which is used for reflecting the transmission light having passed through the second polarizer to the image generating device, and the reflective device is located between the second polarizer and the image generating device.

4. The laser repairing apparatus according to claim 1, further comprising a fixing device which is used for fixing the display panel to the bearing device, and the fixing device is located on the bearing device.

5. The laser repairing apparatus according to claim 1, further comprising an image processing device used for processing the transmission image generated by the image generating device to obtain coordinates of defective pixels on the display panel, and an adjusting device used for adjusting irradiating direction of the laser generating device according to the coordinates, wherein the image processing device is connected to the image generating device, and the adjusting device is connected to the laser generating device.

6. The laser repairing apparatus according to claim 1, further comprising a rotating device which is used for driving the first polarizer and/or the second polarizer to rotate so as to change a relative angle between a polarization axis of the first polarizer and a polarization axis of the second polarizer, and the rotating device is connected to the first polarizer and/or the second polarizer.

7. The laser repairing apparatus according to claim 6, wherein the rotating device comprises an active gear and a driven gear meshing with the active gear, and the first polarizer and/or the second polarizer are fixed to the driven gear.

8. The laser repairing apparatus according to claim 7, wherein the rotating device further comprises a drive motor which is used for driving the active gear to rotate, and the drive motor is connected to the active gear.

9. The laser repairing apparatus according to claim 1, wherein the first polarizer is attached to a light-exiting side of the backlight, and the second polarizer is attached to a light-entering side of the image generating device.

10. The laser repairing apparatus according to claim 1, further comprising a focusing device which is used for adjusting a focal length of the image generating device, and the focusing device is connected to the image generating device.

11. The laser repairing apparatus according to claim 1, wherein when an initial twist angle of liquid crystals in the display panel is zero degree, the first polarizer and/or the second polarizer are adjusted so that a relative angle between a polarization axis of the first polarizer and a polarization axis of the second polarizer is 90 degrees; when the initial twist angle of liquid crystals in the display panel is 90 degrees, the first polarizer and/or the second polarizer are adjusted so that the relative angle between the polarization axis of the first polarizer and the polarization axis of the second polarizer is zero degree.

12. The laser repairing apparatus according to claim 2, wherein when an initial twist angle of liquid crystals in the display panel is zero degree, the first polarizer and/or the second polarizer are adjusted so that a relative angle between a polarization axis of the first polarizer and a polarization axis of the second polarizer is 90 degrees; when the initial twist angle of liquid crystals in the display panel is 90 degrees, the first polarizer and/or the second polarizer are adjusted so that the relative angle between the polarization axis of the first polarizer and the polarization axis of the second polarizer is zero degree.

13. The laser repairing apparatus according to claim 3, wherein when an initial twist angle of liquid crystals in the display panel is zero degree, the first polarizer and/or the second polarizer are adjusted so that a relative angle between a polarization axis of the first polarizer and a polarization axis of the second polarizer is 90 degrees; when the initial twist angle of liquid crystals in the display panel is 90 degrees, the first polarizer and/or the second polarizer are adjusted so that the relative angle between the polarization axis of the first polarizer and the polarization axis of the second polarizer is zero degree.

14. The laser repairing apparatus according to claim 4, wherein when an initial twist angle of liquid crystals in the display panel is zero degree, the first polarizer and/or the second polarizer are adjusted so that a relative angle between a polarization axis of the first polarizer and a polarization axis of the second polarizer is 90 degrees; when the initial twist angle of liquid crystals in the display panel is 90 degrees, the first polarizer and/or the second polarizer are adjusted so that the relative angle between the polarization axis of the first polarizer and the polarization axis of the second polarizer is zero degree.

15. The laser repairing apparatus according to claim 5, wherein when an initial twist angle of liquid crystals in the display panel is zero degree, the first polarizer and/or the second polarizer are adjusted so that a relative angle between a polarization axis of the first polarizer and a polarization axis of the second polarizer is 90 degrees; when the initial twist angle of liquid crystals in the display panel is 90 degrees, the first polarizer and/or the second polarizer are adjusted so that the relative angle between the polarization axis of the first polarizer and the polarization axis of the second polarizer is zero degree.

16. The laser repairing apparatus according to claim 6, wherein when an initial twist angle of liquid crystals in the display panel is zero degree, the first polarizer and/or the second polarizer are adjusted so that a relative angle between a polarization axis of the first polarizer and a polarization axis of the second polarizer is 90 degrees; when the initial twist angle of liquid crystals in the display panel is 90 degrees, the first polarizer and/or the second polarizer are adjusted so that the relative angle between the polarization axis of the first polarizer and the polarization axis of the second polarizer is zero degree.

17. The laser repairing apparatus according to claim 9, wherein when an initial twist angle of liquid crystals in the display panel is zero degree, the first polarizer and/or the second polarizer are adjusted so that a relative angle between a polarization axis of the first polarizer and a polarization axis of the second polarizer is 90 degrees; when the initial twist angle of liquid crystals in the display panel is 90 degrees, the first polarizer and/or the second polarizer are adjusted so that the relative angle between the polarization axis of the first polarizer and the polarization axis of the second polarizer is zero degree.

18. The laser repairing apparatus according to claim 10, wherein when an initial twist angle of liquid crystals in the display panel is zero degree, the first polarizer and/or the second polarizer are adjusted so that a relative angle between a polarization axis of the first polarizer and a polarization axis of the second polarizer is 90 degrees; when the initial twist angle of liquid crystals in the display panel is 90 degrees, the first polarizer and/or the second polarizer are adjusted so that the relative angle between the polarization axis of the first polarizer and the polarization axis of the second polarizer is zero degree.

\* \* \* \* \*